(12) United States Patent
Koya (10) Patent No.: US 7,416,004 B2
(45) Date of Patent: Aug. 26, 2008

(54) PNEUMATIC TIRE WITH TREAD INCLUDING BLOCKS HAVING OPEN AND CLOSED SIPES

(75) Inventor: Mitsuharu Koya, Kobe (JP)

(73) Assignee: Sumitomo Rubber Industries, Ltd., Kobe-shi (JP)

( * ) Notice: Subject to any disclaimer, the term of this patent is extended or adjusted under 35 U.S.C. 154(b) by 0 days.

(21) Appl. No.: 11/199,391

(22) Filed: Aug. 9, 2005

(65) Prior Publication Data
US 2006/0032566 A1 Feb. 16, 2006

(30) Foreign Application Priority Data
Aug. 12, 2004 (JP) ............................. 2004-235512

(51) Int. Cl.
*B60C 11/12* (2006.01)
(52) U.S. Cl. .......................... 152/209.17; 152/209.18; 152/902; 152/DIG. 3
(58) Field of Classification Search ............ 152/209.17, 152/209.18, 902, DIG. 3
See application file for complete search history.

(56) References Cited

U.S. PATENT DOCUMENTS
6,571,844 B1 * 6/2003 Ochi et al. ............. 152/DIG. 3

FOREIGN PATENT DOCUMENTS

| JP | 06-055911 | * | 3/1994 |
|---|---|---|---|
| JP | 06-247110 | * | 9/1994 |
| JP | 10-203121 | * | 8/1998 |
| JP | 10-203121 A | | 8/1998 |
| JP | 11-348510 A | | 12/1999 |
| JP | 2000-006620 | * | 1/2000 |
| JP | 2000-025420 | * | 1/2000 |
| JP | 2002-187413 A | | 7/2002 |
| JP | 2002-347413 A | | 12/2002 |

OTHER PUBLICATIONS

Machine translation for Japan 11-348510.*
Machine translation for Japan 2002-347413.*

* cited by examiner

*Primary Examiner*—Steven D Maki
(74) *Attorney, Agent, or Firm*—Birch, Stewart, Kolasch & Birch, LLP (57) ABSTRACT

A pneumatic tire comprises a tread portion provided with blocks, the blocks are axially divided by at least one circumferential groove and circumferentially divided by oblique grooves inclined with respect to the tire axial direction towards one direction, and each of the blocks is subdivided into at least two parallelogrammic block elements by at least one open sipe extending across the block and inclined with respect to the tire axial direction towards the same direction as the oblique grooves, the parallelogrammic block elements include two block-end elements located on the circumferential ends of the block, and each of the block-end elements is provided with at least one closed sipe extending at an angle of less than 45 degrees with respect to the tire axial direction and terminating within the block to have closed ends.

10 Claims, 7 Drawing Sheets

PNEUMATIC TIRE WITH TREAD INCLUDING BLOCKS HAVING OPEN AND CLOSED SIPES

BACKGROUND OF THE INVENTION

1. Field of the Invention

The present invention relates to a pneumatic tire, more particularly to a tread pattern for winter tire.

2. Description of Background Art

In general, snow tires are provided with block-type tread patterns, and the blocks are provided with a great number of sipes. If the number of sipes in a tread portion are excessively increased, as the blocks are decreased in the rigidity, the amount of deformation or leaning of the blocks during running increases. Therefore, the ground contacting area and grip power are decreased, and as a result, the steering stability is deteriorated and uneven wear is liable to occur on the blocks. cornering performance on ice is important factor for the snow tires as well as straight running performance, e.g. traction, braking distance and the like. As explained above, if a great number of sipes are formed, the difference in the grip power between straight running and cornering is liable to become increased. Therefore, a vehicle provided with such tires is liable to become unstable in its behavior in a time of transition from straight running to cornering.

SUMMARY OF THE INVENTION

It is therefore, an object of the present invention to provide a pneumatic tire, in which the deformation or leaning of the blocks is reduced to improve the uneven wear resistance, cornering performance and the like.

According to the present invention, a pneumatic tire comprises a tread portion provided with blocks, the blocks axially divided by at least one circumferential groove and circumferentially divided by oblique grooves inclined with respect to the tire axial direction towards one direction, and each of the blocks subdivided into at least two parallelogrammic block elements by at least one open sipe extending across the block and inclined with respect to the tire axial direction towards the same direction as the oblique grooves, the parallelogrammic block elements including two block-end elements located on the circumferential ends of the block, and each of the block-end elements provided with at least one closed sipe extending at an angle of less than 45 degrees with respect to the tire axial direction and terminating within the block to have closed ends.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

Embodiments of the present invention will now be described in detail in conjunction with the accompanying drawings.

DETAILED DESCRIPTION OF THE PREFERRED EMBODIMENTS

A pneumatic tire is, as well known in the art, composed of a tread portion 2 whose outer surface defines a ground contacting region, a pair of axially spaced bead portions each with a bead core therein, a pair of sidewall portions extending between the tread edges (e) and the bead portions, a carcass extending between the bead portions through the carcass and sidewall portions, and a tread reinforcing belt disposed radially outside the carcass in the tread portion.

Incidentally, the tread edges (e) are the axial outermost edges of the ground contacting region under a standard loaded condition in which the tire is mounted on the standard rim and inflated to the standard load and then loaded with a standard load. The standard rim is a wheel rim officially approved for the tire by standard organization, i.e. JATMA (Japan and Asia), T&RA (North America), ETRTO (Europe), STRO (Scandinavia) and the like. The standard pressure and the standard tire load are the maximum air pressure and the maximum tire load for the tire specified by the same organization in the Air-pressure/Maximum-load Table or similar list. For example, the standard wheel rim is the "standard rim" specified in JATMA, the "Measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at Various Cold Inflation Pressures" table in TRA or the like. The standard load is the "maximum load capacity" in JATMA, the "Load capacity" in ETRTO, the maximum value given in the above-mentioned table in TRA or the like. In the case of passenger car tires, however, the standard pressure and standard tire load are uniformly defined by 180 kPa and 88% of the maximum tire load, respectively.

In the following embodiments, the pneumatic tire is a radial ply tire for passenger cars.

Figure 1:
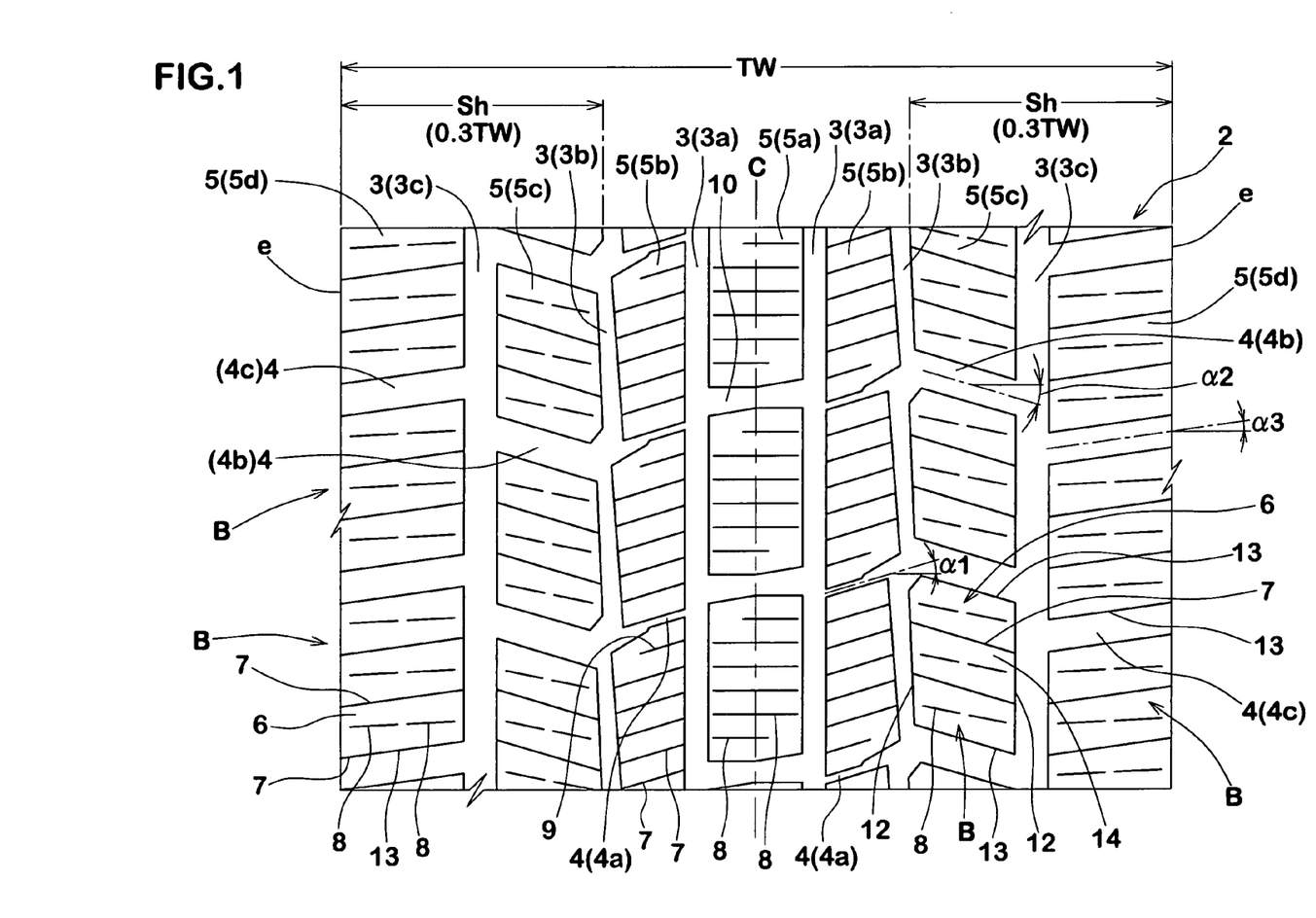
FIG. 1 is a partial developed plan view of a pneumatic tire according to the present invention showing a tread pattern.

The tread portion 2 is provided with tread grooves 3 and 4 forming a tread pattern, and a large number of sipes 7, 8 and 9 are provided.

The sipe has a groove width or slit width of not more than 1.5 mm preferably not more than 1.0 mm, and the sipes are formed during tire vulcanization using blades attached to the inside of the tire vulcanizing mold.

FIG. 1 shows an example of the tread pattern. This tread pattern is substantially symmetric about any point on the tire equator C, namely, a bi-directional tread pattern. It is also possible to provide a uni-directional tread pattern.

The tread grooves include: circumferential grooves 3 extending continuously in the tire circumferential direction; oblique grooves 4 inclining with respect to the axial direction and arranged around the tire in substantially parallel with each other; and axial grooves 10 extending in substantially parallel with the axial direction.

Further, the circumferential grooves 3 include: a pair of axially innermost grooves 3a disposed one on each side of the tire equator C; a pair of axially outermost grooves 3c; and a pair of middle grooves 3b therebetween. The innermost grooves 3a and outermost grooves 3c are straight grooves each having a constant groove width. The middle grooves 3b are zigzag grooves each consisting of alternating long segments and short segments. The outermost grooves 3c are widest, and the middle grooves 3b are narrowest.

The oblique grooves 4 include: axially inner oblique grooves 4a extending between the grooves 3a and 3b; middle oblique grooves 4b extending between the grooves 3b and 3c; and axially outer oblique grooves 4c extending between the groove 3c and the tread edges (e). on each side of the tire equator, the grooves 4a are substantially parallel with each other, the grooves 4b are substantially parallel with each other, and the grooves 4c are substantially parallel with each other. The oblique grooves 4a and 4c are inclined to the same direction but the middle oblique grooves 4b are inclined to the opposite direction thereto.

The axial grooves 10 extend between the two inner circumferential grooves 3a.

When running on snowy road, as the snow is packed into the tread grooves, the increased shearing strength thereof can increase the snow grip. If the angles $\alpha 1, \alpha 2$ and $\alpha 3$ of the oblique grooves 4a, 4b and 4c, respectively, are too small with respect to the tire axial direction, it is difficult to improve the grip during cornering. On the other hand, if too large, the grip force during straight running is liable to become insufficient. Therefore, the angles $\alpha 1$, $\alpha 2$ and $\alpha 3$ are set in the range of not less than 3 degrees preferably not less than 7 degrees, but not more than 25 degrees preferably not more than 20 degrees with respect to the tire axial direction.

If the tread grooves are too narrow in width and/or too shallow in depth, it is difficult to obtain an increased shearing strength. Further, such tread grooves have a disadvantage for the removal of a water film on wet road. On the other hand, if too wide and/or too deep, as the pattern rigidity is decreased, the steering stability on dry road and tread wear resistance tend to deteriorate. Therefore, the tread grooves 3, 4 and 10 are each provided with: a width in a range of not less than 3 mm preferably not less than 5 mm, but not more than 10 mm, preferably not more than 8 mm; and a depth in a range of not more than 10.5 mm, preferably not more than 10.0 mm, but not less than 8.0 mm, preferably not less than 8.5 mm.

Therefore, the tread portion 2 is divided into blocks 5 only, each block 5 having circumferential side faces 12, axial side faces 13 and a ground contacting top surface 14. Thus, in this embodiment, the tread pattern is a very block pattern. The tread portion 2 is not provided with a rib.

The blocks 5 include: center blocks 5a between the innermost circumferential grooves 3a; middle blocks 5b between the innermost circumferential groove 3a and middle groove 3b; inner-shoulder blocks 5c between the middle groove 3b and the outermost circumferential groove 3c; and outer-shoulder blocks 5d between the outermost circumferential groove 3c and tread edges (e).

The shape of the center block 5a is a substantially rectangle long in the tire circumferential direction. The center blocks 5a are disposed on the tire equator C and thus the ground pressure is relatively large. Therefore, in order to maintain a high rigidity, each center block 5a is provided with closed sipes 8 only. The closed sipes 8 in each block 5a are arranged at substantially regular intervals in the tire circumferential direction, and extend in parallel with the tire axial direction.

Here, the closed sipe 8 is a sipe which terminates within the block to have two closed ends.

The middle blocks 5b each have a substantially parallelogrammic shape. Each middle block 5b is provided with open sipes 7 at regular intervals in the tire circumferential direction. The open sipes 7 in each middle block 5b are inclined with respect to the tire axial direction in substantially parallel with the axially inner oblique grooves 4a. The middle block 5b may be provided with the closed sipe 8 and/or a semi-open sipe 9.

Here, the open sipe 7 is a sipe extending across the block to have open ends at the circumferential side faces 12. The semi-open sipe 9 is a sipe whose one end is opened at one of the circumferential side faces 12 whereas the other end is closed in the block.

The inner-shoulder blocks 5c and outer-shoulder blocks 5d are each provided with the open sipes 7 and closed sipes 8.

As the inner-shoulder blocks 5c and outer-shoulder blocks 5d have similar constructions, their common features are first described referring to the blocks 5c and 5d as the "block B" and taking one of the inner-shoulder blocks 5c as example. Then different features are described individually.

Figure 2:
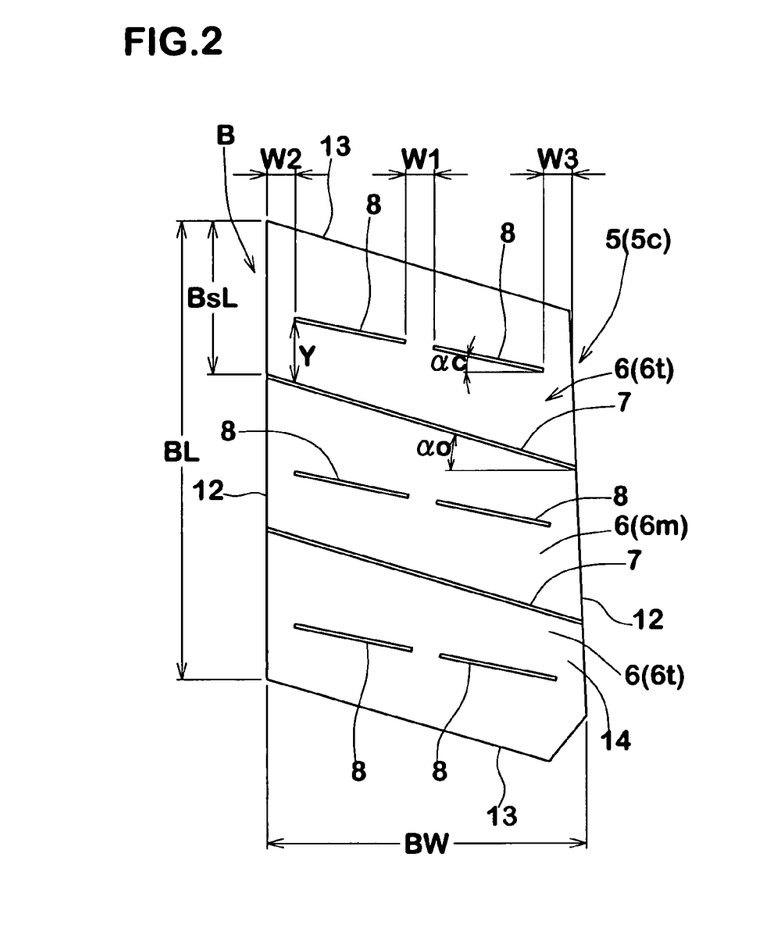
FIG. 2 is an enlarged plan view of a outer-shoulder block thereof.

In FIG. 2, the block B has a parallelogrammic shape being long in the tire circumferential direction. The block B is provided with at least one open sipe 7 (two open sipes 7 in FIG. 2 example) inclined with respect to the tire axial direction towards the same direction as the circumferentially adjacent oblique grooves 4 (right-side downward inclination in FIG. 2). In this example, the open sipe 7 is straight and extends substantially parallel with the oblique grooves 4. Thus, by the open sipes 7, the block B is subdivided into three parallelogrammic block elements 6 having an equi-circumferential-length BsL.

The block elements 6 include two elements 6t at the circumferential ends and one in-between element 6m. The block-end element 6t is provided with at least one, preferably two or more closed sipes 8 each extending at an angle $\alpha c$ of less than 45 degrees with respect to the tire axial direction. In this embodiment, the in-between element 6m is also provided with closed sipes 8 in the same manner as the end element 6t.

If the above-mentioned length BsL of each element is too small, uneven wear is liable to occur. If too large, on-the-ice performance is liable to deteriorate. Thus, each length BsL is set in the range of not less than 28% preferably more than 30%, but not more than 40% preferably less than 38% of the length BL of the block B.

The length BL of the block B is set in the range of not less than 20 mm preferably more than 22 mm, but not more than 40 mm preferably less than 35 mm.

Here, the circumferential length of a block element 6/a block 5 means a length measured along a straight line extending across the block element/block in parallel with the circumferential direction. Thus, it is not always the same as a circumferential length between the circumferential extreme ends thereof. Thus, there is a possibility that the circumferential length varies depending on the measuring position. The length BsL of a block element 6 means the maximum of the circumferential length of the block element 6. The length BL of a block 6 means the maximum of the circumferential length of the block.

In FIG. 2, the closed sipes 8 in each element 6 are straight and arranged in line. The axially adjacent closed sipes 8 are axially spaced apart from each other by an axial distance W1. The closed ends of the closed sipes 8 are spaced apart from the side faces 12 of the block B by axial distances W2 and W3.

The distance W1 is preferably in the range of not less than 0.04 times more preferably more than 0.05 times, but not more than 0.15 times more preferably less than 0.13 times the maximum axial width BW of the block B. If the axial distance W1 is too large, snow performance is deteriorated. If too small, uneven wear of the block is liable to occur.

The distance W2, W3 is preferably set in the range of not less than 0.04 times more preferably more than 0.05 times, but not more than 0.15 times more preferably less than 0.13 times the maximum axial width BW. If the axial distances W2 and W3 are too large, on-the-ice performance deteriorates. If too small, the block rigidity is liable to become insufficient.

By setting the distances as above, the block element is prevented from decreasing in the rigidity and it becomes possible to derive a maximum edge effect. In view of this, it is preferable that the number of the closed sipes 8 is 2 or 3 or 4 per element 6. The total length of the non siped portion, namely, the total (W1+W2+W3) of the distances W1, W2 and W3 is preferably set in the range of not less than 0.12 times more preferably not less than 0.15 times, but not more than 0.45 times more preferably not more than 0.39 times the maximum axial width BW. In order that the block-end element 6$t$ maintains high rigidity, the distance W1 is preferably more than the distance W2, W3.

The difference ($\alpha$o−$\alpha$c) between the angle $\alpha$o of the open sipe 7 and the angle $\alpha$c of the closed sipe 8, each with respect to the axial direction, is more than 0 but not more than 20 degrees, preferably in the range of from 2 to 16 degrees. If the difference is more than 20 degrees, the portion between the open sipe 7 and closed sipe 8 may have unfavorable strength/rigidity anisotropy. If the difference is zero, as the sipes are liable to open when the tire is twisted, steering performance on snow/ice road and uneven wear performance are thus liable to deteriorate. The angles $\alpha$o and $\alpha$c are preferably set in the range of from 0 to 20 degrees, more preferably 1 to 18 degrees. By setting the angle $\alpha$c smaller than the angle $\alpha$o, the anisotropy may be further controlled. ($\alpha$o>$\alpha$c)

In order to decrease the anisotropy of the block element 6 further, the minimum circumferential distance Y between the closed sipe 8 and open sipe 7 as shown in FIG. 2, is preferably set in the range of from 35 to 45% of the length BsL of the block element.

As the shoulder blocks 5$c$ and 5$d$, the blocks B are disposed in tread shoulder regions Sh so that the centroid of the top surface 14 of each block B is positioned within the shoulder region Sh. Here, the shoulder regions Sh are each defined as 30% width region of the ground contacting width TW extending from each tread edges (e). Therefore, even in the tread shoulder regions Sh where the ground pressure becomes high during cornering, uneven wear is effectively prevented.

FIGS. 3-11 each show another example of the block B.

Figure 3:
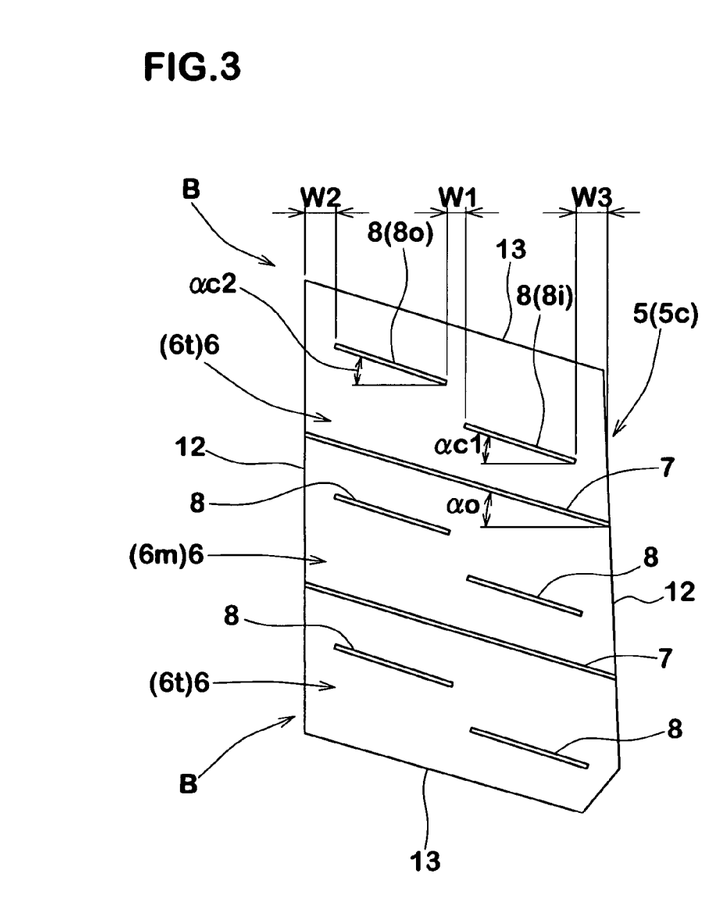
FIGS. 3 to 11 are plan views each showing another example of the outer-shoulder block.

FIG. 3 shows a modification of the block B shown in FIG. 2, wherein the closed sipes 8 in each element 6 are circumferentially shifted from each other. The angle $\alpha$c1 of the closed sipe 8$i$ on the tire equator side is smaller than the angle $\alpha$c2 of the closed sipe 8$o$ on the tread edge side, whereby the circumferential edge component is increased on the tread edge side where the ground pressure becomes higher during cornering and thus on-the-ice cornering performance may be further improved. For this purpose, it is preferred that the angle difference ($\alpha$c2−$\alpha$c1) is in the range of from 1 to 5 degrees.

Figure 4:
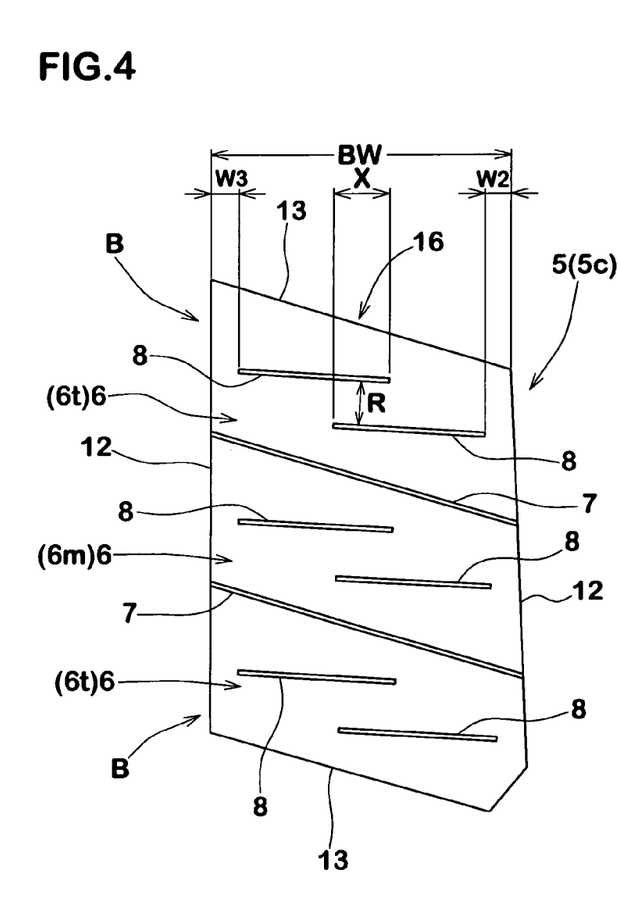

FIG. 4 shows a further modification of the block B shown in FIG. 2, wherein in order to increase the edge length to improve on-the-ice performance without deteriorating the block rigidity, the closed sipes 8 which are substantially same length are formed as being longer than those shown in FIG. 2 and circumferentially-shifted to overlap each other. The axial overlap X of the overlapped part 16 is set in the range of not less than 5% preferably more than 10%, but not more than 20% preferably less than 15% of the maximum axial width BW of the block. In this case, it is desirable that the minimum distance R between the overlapping portions of the closed sipes 8 is at least 1.5 mm.

In the FIG. 4 example, the closed sipes 8 are substantially parallel with the tire axial direction, namely, the angle $\alpha$c is substantially zero. However, the overlapping sipes 8 can be inclined at a positive angle $\alpha$c as shown in FIG. 5.

Figure 5:
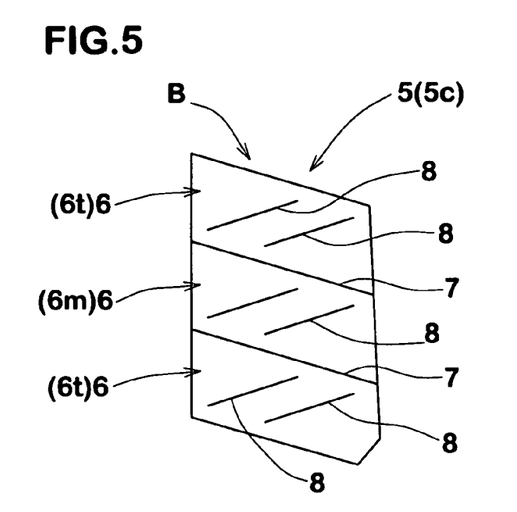

FIG. 5 shows a modification of the block B shown in FIG. 4, wherein the closed sipes 8 are inclined to the opposite direction to that in the FIG. 2 example. In other words, with respect to the tire axial direction, the closed sipes 8 are inclined oppositely to the open sipes 7.

Figures 6, 7:
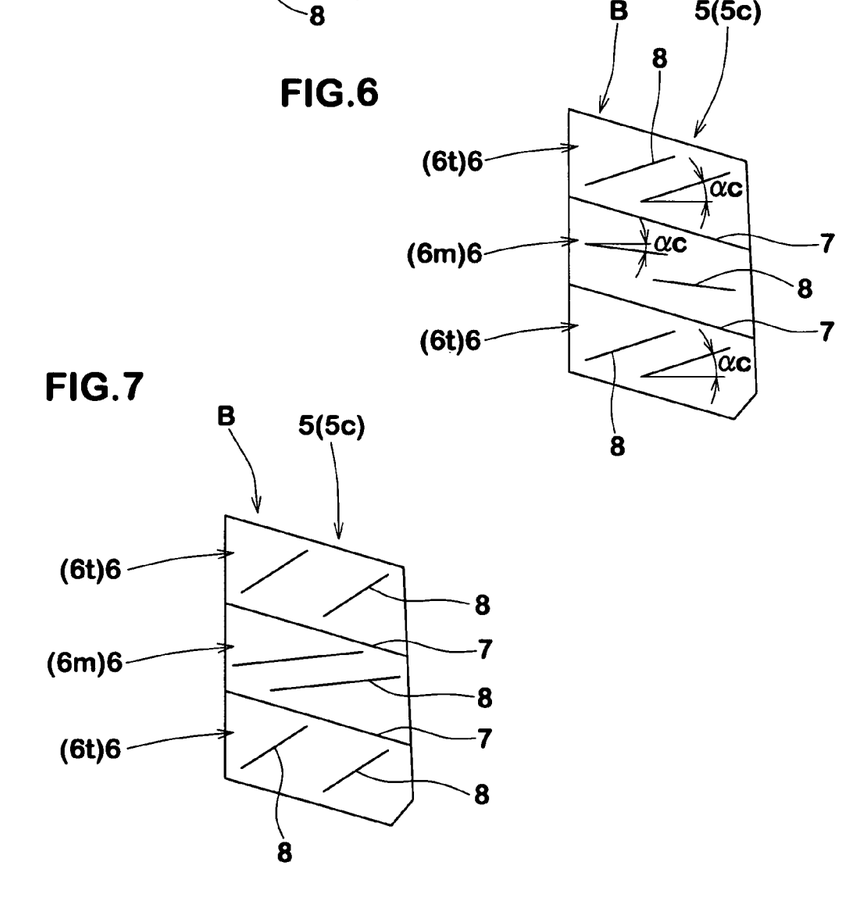

FIG. 6 shows a modification of the block B shown in FIG. 5, wherein the angle $\alpha$c of the closed sipe 8 is changed between the block-end element 6$t$ and in-between element 6$m$. In the in-between element 6$m$, the absolute value of the angle $\alpha$c is set as being smaller than that in the block-end elements 6$t$, and the inclining direction of the closed sipes 8 is opposite to the that in the block-end elements 6$t$.

FIG. 7 shows another modification of the block B shown in FIG. 5, wherein similarly the angle $\alpha$c is changed and the closed sipes 8 in the in-between element 6$m$ are increased in the length when compared with the closed sipe 8 in the block-end element 6$t$.

Figure 8:
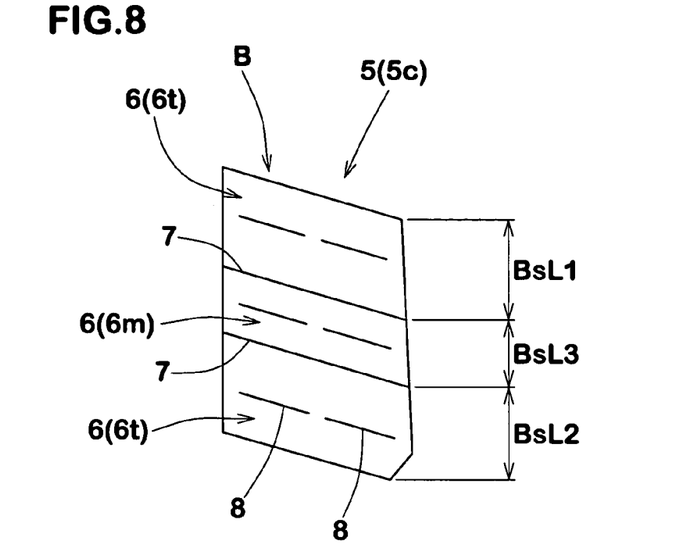

FIG. 8 shows a further modification of the block B shown in FIG. 2, wherein, in order to prevent uneven wear of the block-end elements 6$t$, the circumferential lengths BsL1 and BsL2 thereof are increased, and the lengths BsL1 and BsL2 of the block-end elements 6$t$ are more than the length BsL3 of the in-between element 6$m$.

Figures 9, 10:
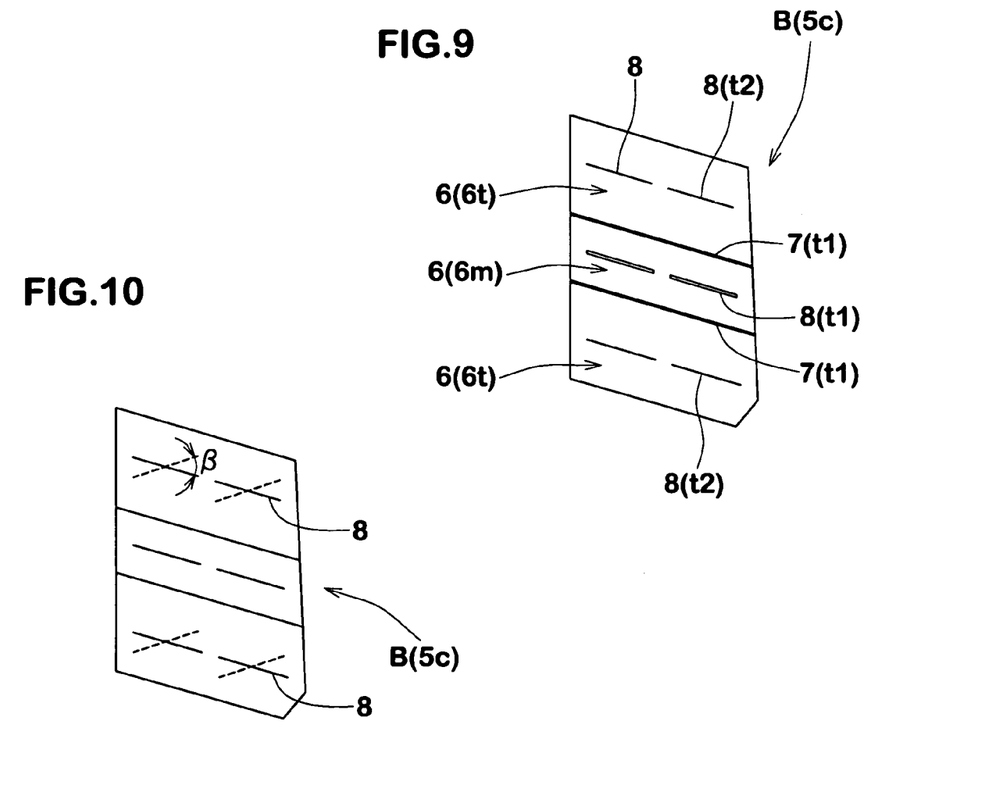

FIG. 9 shows a still more modification of the block B shown in FIG. 2, wherein, the sipes are decreased in the slit width in the block-end elements 6$t$ to increase the rigidity thereof. The closed sipes 8 in the block-end elements 6$t$ have a slit width t2 which is in the range of from about 50% to about 70% of the slit width t1 of the open sipes 7 and closed sipes 8 in the in-between element 6$m$.

In the above-mentioned closed sipe 8, the configuration at the open top is not changed in the depthwise direction. Therefore, if the configuration is straight and its inclination angle is alpha at the open top, the sipe 8 is straight and the angle is alpha at any depth from the top to the bottom. However, the sipe can be formed so that the configuration changes in the depthwise direction for example such that the inclination angle gradually changed from a certain value to another value.

In FIG. 10 showing a modification of the block B shown in FIG. 2, the closed sipe 8 in the end elements 6$t$ are provided with such a construction. Although the sipe shows a straight configuration in any section parallel to the top face of the block, the angle at the top is differed from the angle at the bottom (shown in broken line) because the sipe is twisted. All the sipes are twisted one direction. The twisting angle $\beta$ is a relatively small value, for example, a value from about 2 degrees to about 4 degrees is preferred.

Figure 11:
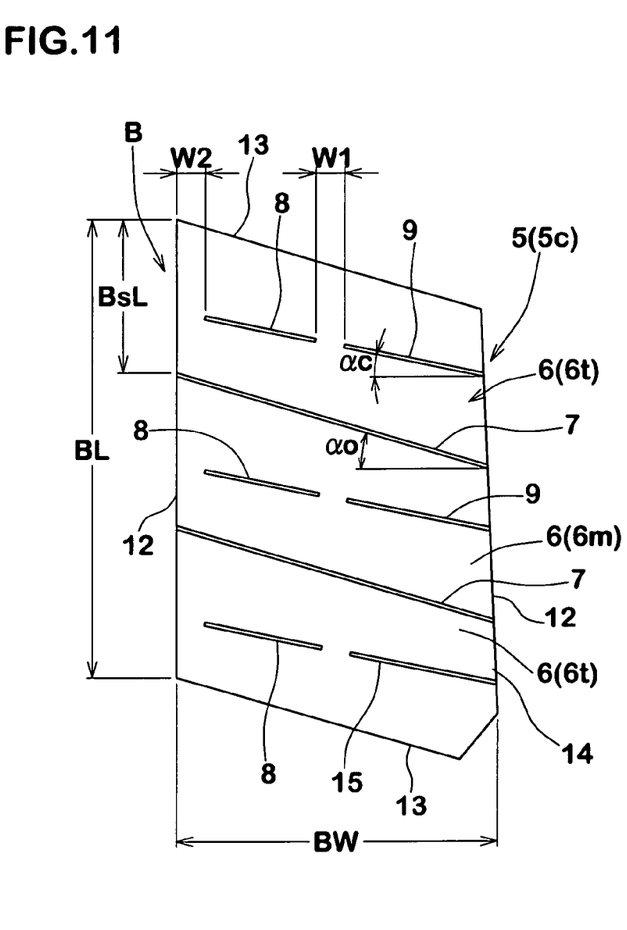

FIG. 11 shows a further modification of the block B shown in FIG. 2, wherein the closed sipes 8 on one side (on the right side in the figure) are extended to the circumferential side face 12, namely, replaced with the semi-open sipes 9. Otherwise this example is same as the FIG. 2 example.

The above arrangements regarding the different circumferential lengths BsL1, BsL2 and BsL3 and the different slit widths t1 and t2 can be combined with any of the above examples.

In the case of the inner-shoulder blocks 5$c$, the circumferential side face 12 on the axially outer side is parallel with the tire equator. But, the circumferential side face 12 on the axially inner side is slightly inclined with respect to with the tire equator as the above-mentioned long segment is inclined. AS the short segment is very short and chamfers the acute angle corner of the block at an angle of about 45 degrees. As the axially inner oblique groove 4$a$ and middle oblique grooves 4$b$ are connected to the opposite ends of the short segment, the junction forms a water accumulating portion.

The long segment is gradually increased in the width towards the chambered corner to effectively lead water to the accumulating portion.

In the outer-shoulder blocks 5d, the circumferential side face 12 on the axially inner side is parallel with the tire equator.

In the block B, as explained above, the closed sipes 8 alternate with the open sipe 7 in the tire circumferential direction. As a result, the block elements support each other to increase the rigidity of the block as a whole, and the deformation or leaning of the blocks is reduced. The block B may be provided as the center block 5a and/or the middle block 5b in addition to the shoulder blocks 5c and 5d.

The tread pattern may be provided between the shoulder regions Sh with a rib or a rib-like circumferential portion substantially continuous in the tire circumferential direction, for example near or on the tire equator.

Comparison Tests

Studless radial tires of size 195/65R15 (wheel rim size 15×6.5) for passenger cars having the same structure except for the tread patterns were manufactured and tested for on-the-ice braking performance, uneven wear resistance, and on-the-snow cornering performance.

In all the tread patterns, the center blocks 5a and middle blocks 5b are same, and all the sipes had a depth of 65% of the block height, and a slit width of 0.5 mm. Other specifications of the tread patterns are shown in Table 1.

On-the-ice Braking Performance Test:

A 2000 cc rear-wheel drive passenger car provided on all the four wheels with test tires was first run on a dry asphalt road for 100 kilometers and then on an ice covered road the four wheels were locked during running at a speed of 30 km/h to obtain the braking distance (Tire inflation pressure 200 kpa). The measurement was made three times and the average value is shown in Table 1, wherein the braking distance is indicated by an index based on Ref.1 being 100. The larger the index number, the better the braking performance.

Uneven wear Resistance Test:

The above-mentioned test car was run on a dry asphalt road for 10000 km and then a difference in wear between the block-end element and in-between element of the outer-shoulder block 5d was measured as uneven wear. The difference was measured about six blocks 5d on a front tire and the average is indicated by an index based on Ref. 1 being 100. The larger the index number, the higher the resistance.

On-the-snow Cornering Performance Test:

The test car was run on an icy road and a snow road covered with trodden snow of 30 mm depth at an air temperature of 0 degree centigrade, and during running, cornering performance was evaluated by the test driver into ten ranks. The results are shown in Table 1. The larger the value, the better the cornering performance.

TABLE 1

Figure 12:
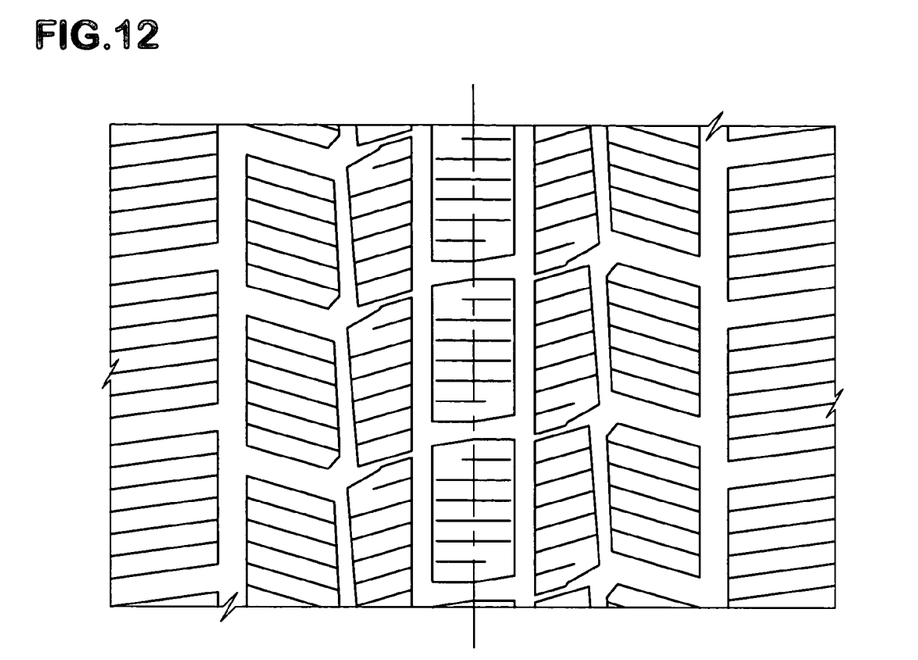
FIGS. 12 to 15 are partial developed views each showing a tread pattern used in the undermentioned comparison tests.
Figure 13:
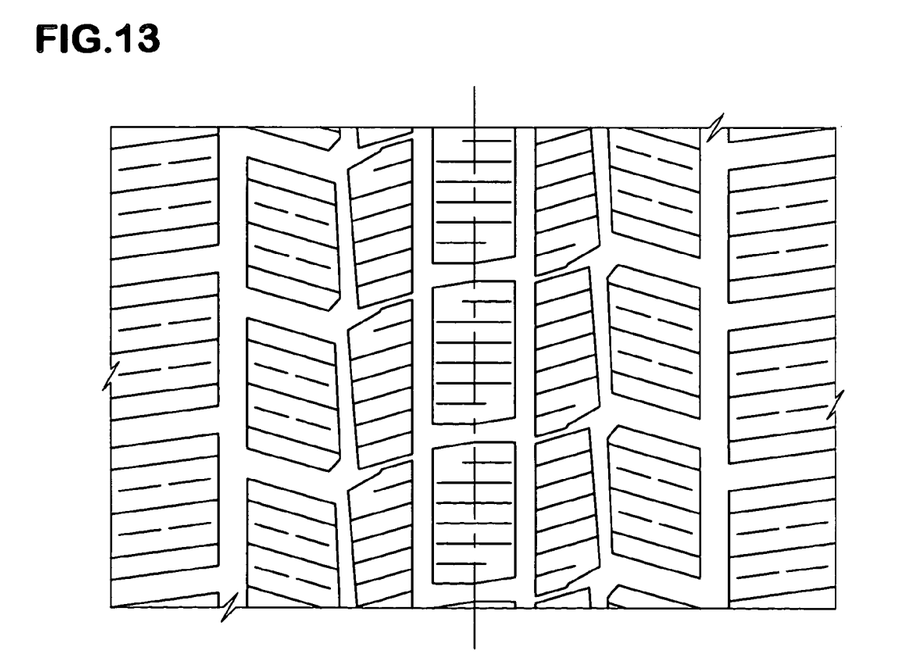
Figure 14:
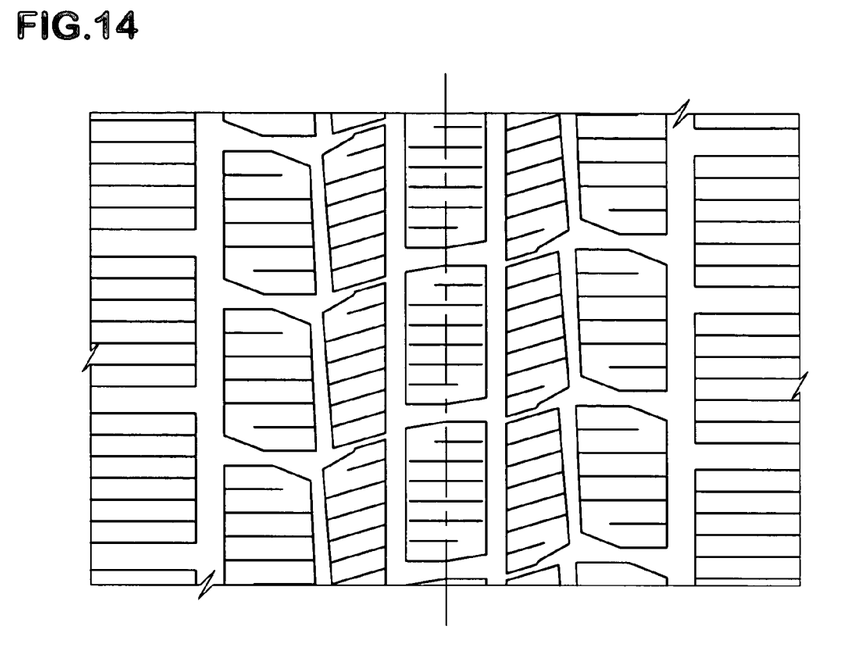
Figure 15:
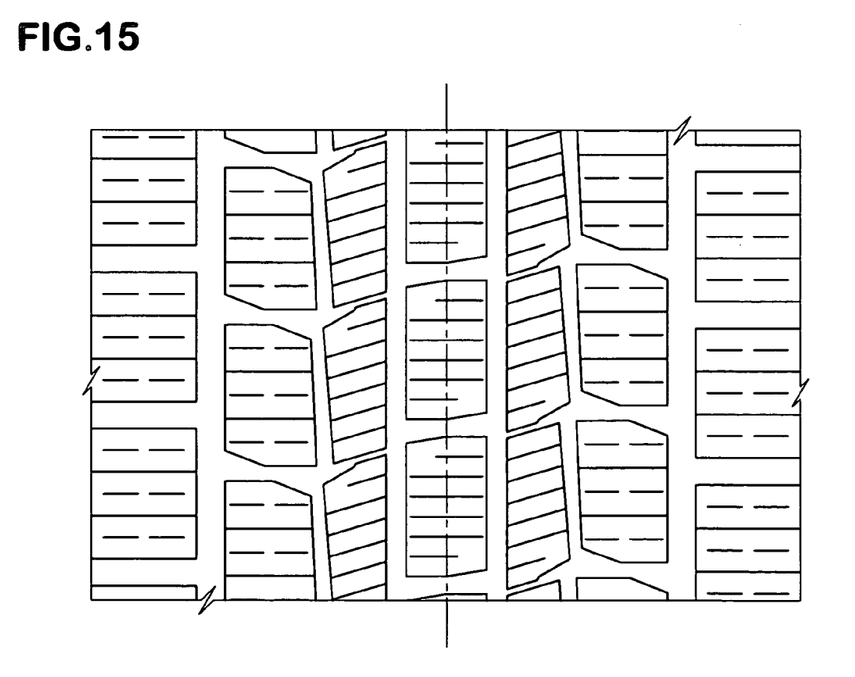

| Tire | Ref. 1 | Ref. 2 | Ref. 3 | Ref. 4 | Ex. 1 | Ex. 2 | Ex. 3 | Ex. 4 | Ex. 5 | Ex. 6 | Ex. 7 |
|---|---|---|---|---|---|---|---|---|---|---|---|
| Tread pattern | FIG. 12 | FIG. 13 | FIG. 14 | FIG. 15 | FIG. 1 | FIG. 1 | FIG. 1 | FIG. 1 | FIG. 1 | FIG. 1 *1 | FIG. 1 *2 |
| Shoulder blocks | FIG. 12 | FIG. 13 | FIG. 14 | FIG. 15 | FIG. 2 | FIG. 2 | FIG. 2 | FIG. 2 | FIG. 2 | FIG. 3 | FIG. 4 |
| Oblique grooves *2 | | | | | | | | | | | |
| angle α1 (deg.) | −18 | −18 | 0 | −18 | −18 | −18 | −18 | −18 | −20 | −18 | −18 |
| angle α2 (deg.) | +18 | +18 | 0 | +18 | +18 | +18 | +18 | +18 | +20 | +18 | +18 |
| angle α3 (deg.) | −8 | −8 | −8 | −8 | −8 | −8 | −8 | −18 | −20 | −8 | −8 |
| Inner-shoulder blocks | | | | | | | | | | | |
| Open sipe *2 | | | | | | | | | | | |
| angle αo (deg.) | +18 | +18 | 0 | 0 | +18 | +18 | +18 | +18 | +20 | +18 | +18 |
| Closed sipe *2 | | | | | | | | | | | |
| angle αc (deg.) | — | +18 | — | 0 | +16 | +16 | +16 | +2 | +18 | αc1: +14 | 0 |
| | | | | | | | | | | αc2: +16 | |
| αo-αc (deg.) | — | 0 | — | 0 | 2 | 2 | 2 | 16 | 2 | 4, 2 | +18 |
| W1/BW | — | 0.07 | — | 0.07 | 0.07 | 0.04 | 0.07 | 0.07 | 0.07 | 0.07 | 0.01 |
| W2/BW | — | 0.1 | — | 0.1 | 0.1 | 0.1 | 0.13 | 0.1 | 0.1 | 0.1 | 0.1 |
| W3/BW | — | 0.1 | — | 0.1 | 0.1 | 0.1 | 0.13 | 0.1 | 0.1 | 0.1 | 0.1 |
| Outer-shoulder blocks | | | | | | | | | | | |
| Open sipe *2 | | | | | | | | | | | |
| angle αo (deg.) | −8 | −8 | 0 | 0 | −8 | −8 | −8 | −18 | −20 | −8 | −8 |
| Closed sipe *2 | | | | | | | | | | | |
| angle αc (deg.) | — | −8 | — | 0 | −6 | −6 | −6 | −2 | −18 | αc1: −4 | 0 |
| | | | | | | | | | | αc2: −6 | |
| αo-αc (deg.) | — | 0 | — | 0 | 2 | 2 | 2 | −16 | 2 | 4, 2 | −8 |
| W1/BW | — | 0.07 | — | 0.07 | 0.07 | 0.04 | 0.07 | 0.07 | 0.04 | 0.07 | 0.1 |
| W2/BW | — | 0.09 | — | 0.09 | 0.09 | 0.09 | 0.13 | 0.09 | 0.09 | 0.09 | 0.09 |
| W3/BW | — | 0.09 | — | 0.09 | 0.09 | 0.09 | 0.13 | 0.09 | 0.09 | 0.09 | 0.09 |
| Test results | | | | | | | | | | | |
| Braking performance | 100 | 100 | 95 | 110 | 120 | 120 | 100 | 125 | 105 | 115 | 115 |
| Uneven wear resistance | 100 | 90 | 80 | 90 | 120 | 100 | 110 | 110 | 105 | 115 | 110 |
| Braking performance | 6 | 6 | 5 | 5.5 | 7 | 6 | 6 | 6 | 6 | 6.5 | 6.5 |
| Cornering performance | 6 | 6 | 5 | 5.5 | 7.5 | 6 | 6.5 | 6 | 6 | 7 | 6.5 |

*1) In Ex. 6, the tread pattern was based on FIG. 1 but the block B shown in FIG. 3 was used as the shoulder blocks 5c and 5d. In Ex. 7, the tread pattern was based on FIG. 1 but the block B shown in FIG. 4 was used as the shoulder blocks 5c and 5d.
*2) In the sipe angles, plus(+) means clockwise and minus(−) means counterclockwise in FIG. 2.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A pneumatic tire comprising a tread portion provided with blocks, said blocks axially divided by at least one circumferential groove and circumferentially divided by oblique grooves inclined with respect to the tire axial direction towards one direction, and each said block subdivided into at least two parallelogrammic block elements by at least one open sipe extending across the block and inclined at an inclination angle $\alpha o$ with respect to the tire axial direction towards the same direction as the oblique grooves, wherein said at least one open sipe is substantially parallel with the oblique grooves adjacent to the block, whereby said at least two parallelogrammic block elements are arranged side-by-side in the tire circumferential direction, said at least two parallelogrammic block elements including two block-end elements located on the circumferential ends of the block, and each said parallelogrammic block element provided with at least one closed sipe extending at an inclination angle $\alpha c$ of less than 45 degrees with respect to the tire axial direction and terminating within the block to have closed ends, wherein the difference ($\alpha o - \alpha c$) between said angles $\alpha o$ and $\alpha c$ is more than 0 but not more than 45 degrees, and said two block-end elements are each provided with a plurality of closed sipes inclusive of said at least one closed sipe, which are circumferentially shifted from each other so as not to align with each other.

2. The pneumatic tire according to claim 1, wherein said at least one closed sipe is straight.

3. The pneumatic tire according to claim 1 or 2, wherein said at least one closed sipe is a plurality of axially spaced closed sipes.

4. The pneumatic tire according to claim 1 or 2, wherein said at least one closed sipe is a plurality of closed sipes axially spaced apart from each other by a distance of from 0.04 to 0.15 times the maximum axial width of the block.

5. The pneumatic tire according to claim 1 or 2, wherein said at least one closed sipe is inclined with respect to the tire axial direction towards the same direction as the oblique grooves.

6. The pneumatic tire according to claim 1, wherein each of the block end elements is defined by one of the oblique grooves and the open sipe closest to the oblique groove.

7. The pneumatic tire according to claim 1, wherein the two block-end elements are aligned with each other in the circumferential direction.

8. The pneumatic tire according to claim 1, wherein the oblique grooves are straight.

9. A pneumatic tire comprising a tread portion provided with blocks, said blocks axially divided by at least one circumferential groove and circumferentially divided by oblique grooves inclined with respect to the tire axial direction towards one direction, and each said block subdivided into at least two parallelogrammic block elements by at least one open sipe extending across the block and inclined with respect to the tire axial direction towards the same direction as the oblique grooves, wherein said at least one open sipe is substantially parallel with the oblique grooves adjacent to the block, whereby said at least two parallelogrammic block elements are arranged side-by-side in the tire circumferential direction, block-end elements located on the circumferential ends of the block, and each said parallelogrammic block element provided with at least one closed sipe extending at an angle of less than 45 degrees with respect to the tire axial direction and terminating within the block to have closed ends, said at least one closed sipe provided on the block-end element is only one closed sipe, and the block-end element is further provided with a semi-open sipe whose one end is closed within the element and the other end is opened at a circumferential side face of the block, and the semi-open sipe is axially spaced apart from the closed sipe.

10. The pneumatic tire according to claim 9, wherein each of the block end elements is defined by one of the oblique grooves and the open sipe closest to the oblique groove.

* * * * *